US006999436B2

(12) United States Patent
Zheng et al.

(10) Patent No.: US 6,999,436 B2
(45) Date of Patent: Feb. 14, 2006

(54) METHOD AND APPARATUS FOR EFFICIENT ROUTING OF MOBILE NODE PACKETS

(75) Inventors: Haihong Zheng, Coppell, TX (US); Franck Le, Irving, TX (US); Marc Greis, Irving, TX (US)

(73) Assignee: Nokia Corporation, Espoo (FI)

( * ) Notice: Subject to any disclaimer, the term of this patent is extended or adjusted under 35 U.S.C. 154(b) by 831 days.

(21) Appl. No.: 09/834,877

(22) Filed: Apr. 16, 2001

(65) Prior Publication Data

US 2002/0150062 A1    Oct. 17, 2002

(51) Int. Cl.
*H04Q 7/00* (2006.01)

(52) U.S. Cl. ............... 370/331; 370/328; 370/329; 455/436; 455/439; 455/438; 455/440

(58) Field of Classification Search ............... 370/331, 370/349, 347, 348, 328, 329; 455/436–440
See application file for complete search history.

(56) References Cited

U.S. PATENT DOCUMENTS 5,825,759 A * 10/1998 Liu .......................... 370/331
6,160,804 A * 12/2000 Ahmed et al. ............ 370/349
6,172,986 B1 * 1/2001 Watanuki et al. .......... 370/466
6,665,537 B1 * 12/2003 Lioy ......................... 455/435.1
2002/0085517 A1 * 7/2002 Lee et al. .................. 370/331

OTHER PUBLICATIONS

Internet Enginneering Task Force, "RSVP Support for Mobile IP Version 6 in Wireless Environments", Nov. 1998, pp. 22.*
"RSVP Support for Mobile IP Version 6 in Wireless Environments", Internet Engineering Task Force, Nov. 1998, pp. 1-22.

* cited by examiner

*Primary Examiner*—Wellington Chin
*Assistant Examiner*—Mark A. Mais
(74) *Attorney, Agent, or Firm*—Squire, Sanders & Dempsey LLP (57) ABSTRACT

Method and apparatus for efficient routing of mobile node packets. Nodes in a network are configured to classify a received flow from a mobile node to a second node based upon a home address option in a packet in the flow if the address is present. The address is a home address of the mobile node. The classification has associated reserved resources at each node for the received flow. Therefore, the Quality of Service is maintained for the flow between the mobile node and the second node if the mobile node moves to a new location. Resources reserved in nodes in the old path are torn down and released, while reserved resources in nodes in the old and the new path need not be reserved again.

53 Claims, 4 Drawing Sheets

METHOD AND APPARATUS FOR EFFICIENT ROUTING OF MOBILE NODE PACKETS

BACKGROUND

1. Field of the Invention

This invention relates to mobile nodes or devices, and more specifically to efficient routing of packets of mobile nodes.

2. Background Information

Wireless access to the Internet is becoming more and more popular. Wireless devices used to access the Internet include, for example, mobile phones, personal digital assistants (PDA), and notebook computers. Mobile IP is an emerging set of extensions to the Internet Protocol (IP) for packet data transmission. This allows wireless devices (mobile nodes) to roam without continually changing the wireless device's IP addresses and reinitializing sessions.

The IP protocol routes packets to their destinations according to IP addresses. These addresses are normally associated with a fixed network location. When a packet origination or destination is a mobile node, each new point of attachment to the network made by a mobile node is associated with a new IP address. In mobile IP, when a mobile node moves to a village network (subnetwork outside of the mobile node's home subnetwork), the mobile node gets assigned a temporary address known as a Care of Address (CoA). The CoA changes at each new point of attachment by the mobile node. After a mobile node gets a CoA, the mobile node uses this care of address as the source IP address for its packets.

Many flows (i.e., set of packets with a common source address and destination address) only require a best effort class of quality of service (QoS). These type flows may not require strict bandwidth, delay, or other requirements. However, flows that carry IP packets comprising multimedia streams such as video conferencing may demand a higher level of quality of service. Therefore, it is important that mobile IP be interoperable with protocols that provide real time services in the Internet.

Resource reservation protocol (RSVP) is a protocol designed for an integrated services Internet. The RSVP protocol may be used by an originating node to request specific qualities of service from the network for particular application data streams or flows. RSVP may also be used by routers to deliver quality of service requests to all nodes along the paths of the flows and to establish and maintain state to provide the requested service. RSVP requests generally result in resources being reserved in each RVSP node (i.e., RSVP router) along the data path of the flow.

A RSVP reservation is based on a "flow spec" and a "filter spec". The flow spec specifies a desired QoS, while the filter spec is used to set parameters in the packet classifier. In order to provide the appropriate desired QoS to a flow, a RSVP packet classifier selects data packets based on the filter spec which uses the sender IP address as one of the parameters and optionally the UDP/TCP port number.

When an RSVP node receives a flow containing one or more packets, the RSVP node tries to identify the packet based on the source (i.e., sender) IP address. For a mobile node that has moved from its home location, this source IP address will consist of the care of address in the IP header. When a channel is initially set up to carry a flow between a mobile node and a second node (e.g., correspondent node), the channel (i.e., path) is set up based on a home IP address of the mobile node, not the care of address. The home address tells RSVP routers that exist in the path, between the source and destination points of the flow, whether the packets get previously reserved resources associated with a flow from the home address. RSVP nodes only know home address and not care of address. Therefore, when an RSVP node processes packets as currently defined today, the original packet classifier does not recognize the flow from a relocated mobile node because the particular session (represented now by the care of address) will not match any of the filter specs (that contain the home address). Thus, the classifier cannot provide the desired QoS since routers on the path of the relevant traffic flows are not able to classify these packets correctly. The reserved resources will be wasted, and the flow will instead be handled as best effort traffic.

Moreover, using the current RSVP specification, a new end-to-end RSVP reservation procedure needs to be performed in order to maintain the same QoS after the mobile node has obtained a new care of address. This is not realistic and inefficient for real time applications because the traffic (flow) sent while the end-to-end reservation procedure takes place can only obtain best effort treatment. Current methods use the care of address for flow identification, however, the care of address can change rapidly during a flows lifetime, therefore, making this method also problematic.

Another problem arises when a mobile node changes its point of attachment and performs handoff. In the uplink direction, a mobile node can reissue a path message, which causes a RESV message to be sent from a crossover router (i.e., a router which lies in both the old and new path from a mobile node to a correspondent node). However, the reservation on the old path between the crossover router and the mobile node's former point of attachment remains in place until the reservation state for this path times out. This is problematic, especially when considering that a mobile node can change its point of attachment very frequently.

Another problem is that the old care of address of a mobile node may be reused after it changes its point of attachment to the Internet. This may imply that if reservations are identified based on the care of address, another node could benefit from a reservation which has not been removed and which has also not timed out yet.

A further problem with current systems is that if sessions are identified based on the care of address, it is necessary to set up fully new RSVP sessions after a mobile node receives a new care of address instead of just updating the existing sessions. In the worst case, this could mean that a session which still exists for a mobile node's old care of address (i.e., a session which has not timed out yet) could block the establishment of the session for the new care of address, even though both sessions are meant to handle the same traffic flow.

Moreover, a problem exists in that in order for RSVP daemon in a correspondent node to obtain the care of address of the mobile node, mobile IP needs to provide an interface to reveal the care of address of the mobile node, which could also be used by any other application. This violates the location privacy requirement.

A further problem exists in that it is also necessary to always negotiate the new RSVP sessions all the way between a mobile node and a correspondent node. This precludes optimized solutions where it would be possible to only set up the path between the mobile node and the crossover router.

In addition, current methods of handoffs when a mobile node moves to another point of attachment are inefficient. Currently, when a mobile node moves to another point of attachment, the mobile node sends a binding update to the correspondent node. However, the correspondent node does not act upon it immediately. Therefore, the path between the crossover router and the mobile node does not receive the proper QoS until the next PATH refresh message. Additionally, if a mobile node sends a RESV refresh message before the next PATH refresh message, the mobile node receives a error message because the routers on the path between the mobile node and crossover router are not aware of the RSVP session yet. An immediate solution to this problem may be to trigger a PATH refresh at the correspondent node when the binding update is received. However, this implies that it takes one and one half round trips between the mobile node and the correspondent node to set up the QoS on the path between the mobile node and crossover router (which may be a very short path as compared to the path between the mobile node and correspondent node). This mechanism is highly inefficient.

Therefore, there is a need for efficient routing of mobile node packets, specifically when RSVP is used in mobile IP nodes.

SUMMARY

The present invention is directed to a method for efficient use of resource reservation protocol (RSVP) in mobile Internet Protocol (IP) nodes that includes: configuring a classification function at each RSVP router to classify a received flow based upon a home address option in a destination option header of an IP packet in the flow if the address is present; moving a mobile node from a first subnetwork location to a second subnetwork location, where the second subnetwork location is outside a home address subnetwork of the mobile node; sending a configuration message from the mobile node along a path to a second node; sending a confirmation message from the second node along the path to the mobile node, where the confirmation message reserves resources in RSVP routers in the path for a flow from the mobile mode; sending the flow containing at least one IP packet from the mobile node to the second node along the path, where each at least one packet has a temporary source address in a source address field of a IP header of each at least one IP packet and the home address of the mobile device in the destination option header of each at least one IP packet; classifying the flow by each RSVP router in the path based on the destination option header; and routing the flow by each RSVP router in the path, where each RSVP router in the path uses the reserved resources associated with the flow based on the classification.

The mobile node may be a mobile phone. The second node may be a phone. The temporary source address may be a Care of Address (CoA). The first subnetwork may be a first IP subnet and the second subnetwork may be a second IP subnet. The home address may be an IP address. The configuration message may be a PATH message. The confirmation message may be a RESV message.

The method may further include: moving the mobile node from the second subnetwork location to a third subnetwork location; sending a second configuration message from the mobile node to a crossover RSVP router in the path, where the second configuration message is sent along a second path from the mobile node to the crossover RSVP router; sending a second confirmation message from the crossover RSVP router to the mobile node, where the second confirmation message reserves resources in RSVP routers in the second path for the flow from the mobile mode; and sending the flow from the mobile node to the second node along the second path between the mobile node and the crossover RSVP router and the path between the crossover RSVP router and the second node.

The method may further include sending a teardown message from the crossover RSVP router to a RSVP router in the path that is not between the crossover RSVP router and the second node, where the teardown message is propagated to all other RSVP routers in the path that are not between the crossover RSVP router and the second node. The teardown message may cause each RSVP router in the path that is not between the crossover RSVP router and the second node to release the reserved resources for the flow from the mobile mode. The teardown message may be a RESVTEAR message.

The present invention is further directed to an article comprising a storage medium having instructions stored therein, the instructions when processed causing a RSVP router to perform: receiving configuration information that configures the RSVP router to classify a received flow based upon an address in a destination option header of an IP packet in the flow if the address is present; reserving resources in the RSVP router for a flow based on receipt of a message; receiving the flow, where the flow contains at least one IP packet; classifying the flow by the RSVP router based on the destination option header in each at least one IP packet; and routing the flow by the RSVP router, where the routing uses the reserved resources associated with the flow based on the classification.

The instructions may further cause: receiving a second message; propagating the second message to other RSVP routers if appropriate; and releasing the reserved resources for the flow in response to the second message.

The present invention is also directed to a network that includes: at least one first node; at least one second node; and at least one RSVP router, where each at least one RSVP router is configured to classify a received flow based upon a home address option in a destination option header in IP packets in the flow if the address is present. One at least one first node sends a flow comprising at least one IP packet to one at least one second node. At least one RSVP router reserves resources in the router for the flow based on receipt of a previous message. The at least one RSVP router classifys the flow based on the destination option header in each at least one IP packet, and routes the flow using the reserved resources associated with the flow based on the classification.

Moreover, the present invention is directed to a RSVP router that includes: a reservation module, where the reservation module reserves resources for a flow in response to receipt of a message from a second node; a receiving module, where the receiving module receives the flow consisting of at least one IP packet, and where the flow originates at a first node and having a destination of the second node; a classification module, where the classification module classifies the received flow based upon a home address option in a destination option header in the at least one IP packet in the flow if the address is present; and a routing module, where the routing module routes the received flow using the reserved resources associated with the flow based on the classification.

The present invention is additionally directed to a method for efficient handoff during use of resource reservation protocol (RSVP) in mobile Internet Protocol (IP) nodes that includes: sending a flow containing one or more IP packets from a mobile node in a first subnetwork location to a second node along a first path, where at least one RSVP router is in the first path between the mobile node and the second node;

moving the mobile node from the first subnetwork location to a second subnetwork location; sending a first message from the mobile node along a second path to the second node, where the second path includes one of the at least one RSVP routers in the first path, and a portion of the first path between the one at least one RSVP router and the second node is part of the second path; sending a second message from the mobile node to second node or the one at least one RSVP router, where the second message triggers the sending of a third message from the second node or the one at least one RSVP router to the mobile node; sending a fourth message from the one at least one RSVP router to the at least one RSVP router in the first path that is not part of the portion of the first path between the one at least one RSVP router and the second node, where the fourth message removes reservations for the flow; and receiving the third message by the mobile node and sending a fifth message from the mobile node to the one at least one RSVP router, where the fifth message reserves resources for the flow in each RSVP router in the second path between the one at least one RSVP router and the mobile node.

The mobile node may be a mobile phone. The second node may be a phone. The first message may be a binding update message. The second message may be a care of address advertisement RSVP message. The third message may be a PATH message. The fourth message may be a RESVTEAR message. The fifth message may be a RESV message. The third message may be sent from the one at least one RSVP router to the second node.

BRIEF DESCRIPTION OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION

The particulars shown herein are by way of example and for purposes of illustrative discussion of the embodiments of the present invention. The description taken with the drawings make it apparent to those skilled in the art how the present invention may be embodied in practice.

Further, arrangements may be shown in block diagram form in order to avoid obscuring the invention, and also in view of the fact that specifics with respect to implementation of such block diagram arrangements is highly dependent upon the platform within which the present invention is to be implemented, i.e., specifics should be well within purview of one skilled in the art. Where specific details (e.g., circuits, flowcharts) are set forth in order to describe example embodiments of the invention, it should be apparent to one skilled in the art that the invention can be practiced without these specific details. Finally, it should be apparent that any combination of hard-wired circuitry and software instructions can be used to implement embodiments of the present invention, i.e., the present invention is not limited to any specific combination of hardware circuitry and software instructions.

Although example embodiments of the present invention may be described using an example system block diagram in an example host unit environment, practice of the invention is not limited thereto, i.e., the invention may be able to be practiced with other types of systems, and in other types of environments (e.g., servers).

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

The present invention relates to efficient routing of mobile node packets. To illustrate the present invention, IP packets and network along with RSVP nodes (routers) will be used. However, the present is not limited to RSVP routers or IP packets. Any type nodes, protocols, networks, etc. that perform efficient routing of mobile node packets as illustrated herein are within the spirit and scope of the present invention. Using RSVP and IP as example embodiments, according to the present, RSVP nodes check a destination option header to determine if it contains a home address option of the mobile node. If the home address option is present, the RSVP node uses the home address of the mobile node to perform classification, otherwise the RSVP node uses the source IP address as ususal. According to the mobile Internet protocol, version 6 (IPv6) specification, a home address option must be included in clear text in the destination option header of every IP packet when mobile IP is used. In the presence of the home address option, the filter spec sent by the sender should include the home address of the sender and optionally the UDP/TCP port number source port.

Therefore, in methods and apparatus according to the present invention, whenever a RSVP node receives an IP packet, the destination option header is checked first. Moreover, when the mobile node moves to another serving system, a new message (e.g., PATH message) may be sent by the mobile node, but this message only propagates upstream (along the new path) until it reaches a crossover point where an existing reservation already exists. The crossover point may be a crossover RSVP router that does not forward the PATH message further upstream, but sends a RESV message back to the mobile node via the same new path instead. The crossover RSVP router (i.e., node) is in both the old path (before the mobile node moved) and the new path between the mobile node and a destination node.

Figure 1:
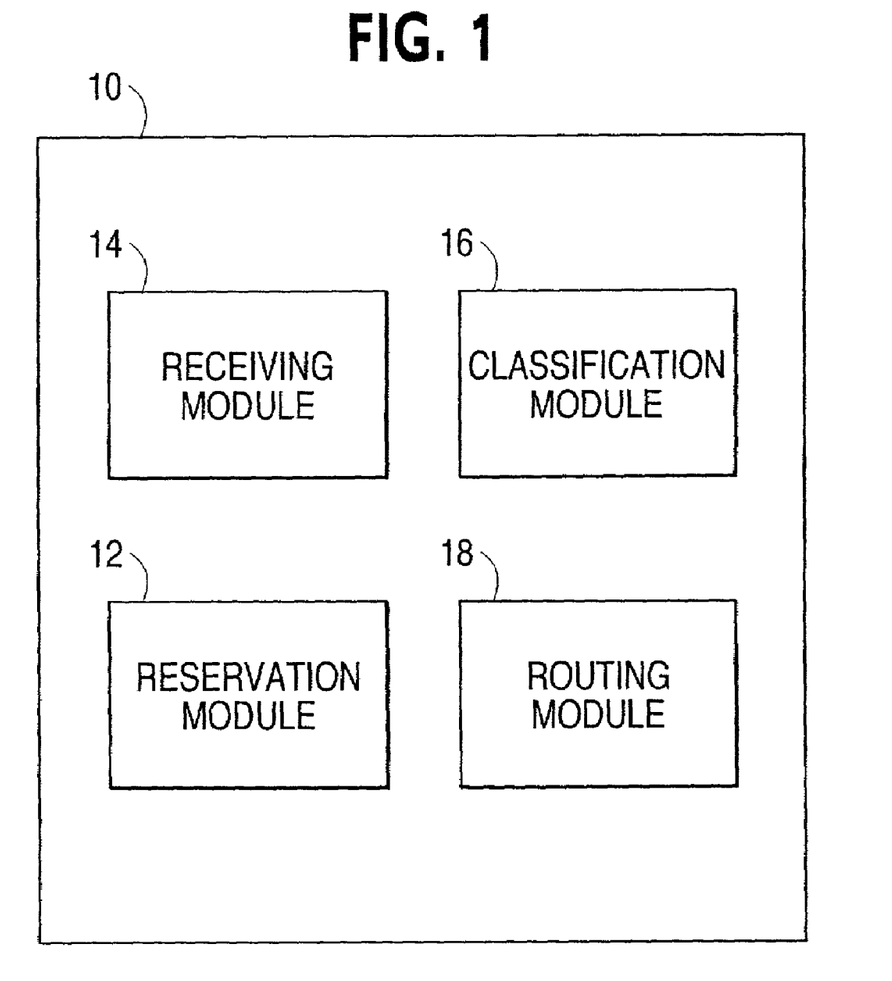
FIG. 1 is a block diagram of an example RSVP node according to an example embodiment of the present invention.

FIG. 1 shows a block diagram of an example RSVP node according to an example embodiment of the present invention. An RSVP node according to the present invention may be any of many types of processing devices, e.g., a server, a router, or other computing device. As shown in FIG. 1, RSVP node 10 may include a reservation module 12, a receiving module 14, a classification module 16, and a routing module 18. Each of these modules perform a particular function for the RSVP router, and may be composed of software, hardware, or a combination of software and hardware elements. Further, although shown as separate blocks in FIG. 1, the function of one or all of these blocks may be included in one section of hardware or software or a combination thereof and still be within the spirit and scope of the present invention. Other modules or functionality may also exist in RSVP node 10.

Reservation module 12 reserves resources for a flow in response to receipt of a message from a node. The node sending the message is normally a destination node for the flow. For example, this message may be a RSVP message that is sent from a destination node back to the originating node. The RSVP message sets up and reserves resources in each of the RSVP nodes in the path between the originating node and the destination node. Receiving module 14 then receives the flow sent from the originating node. The flow may be comprised of one or more IP packets. The flow originates at the originating node and has a destination of a second node. The RSVP router sits somewhere in the path of the flow between the originating node and the destination node.

Classification module 16 classifies the received flow based upon an address (home address) in the destination option header in the IP packets in the flow, if the address is present. The classification compares the home address with addresses stored to determine if the packets receive reserved resources previously setup for this particular flow from this home address. This insures that packets in the flow get the desired QoS. If there is no address in the destination option header, the RSVP node uses the address in the source IP address field of the packet to determine the quality of service for the packets. This may normally be a best effort quality of service.

Routing module 18 routes the received flow using the reserved resources associated with the flow (if an address exists in the destination option header) based on the classification. These processes will be further illustrated using FIG. 2.

Figure 2:
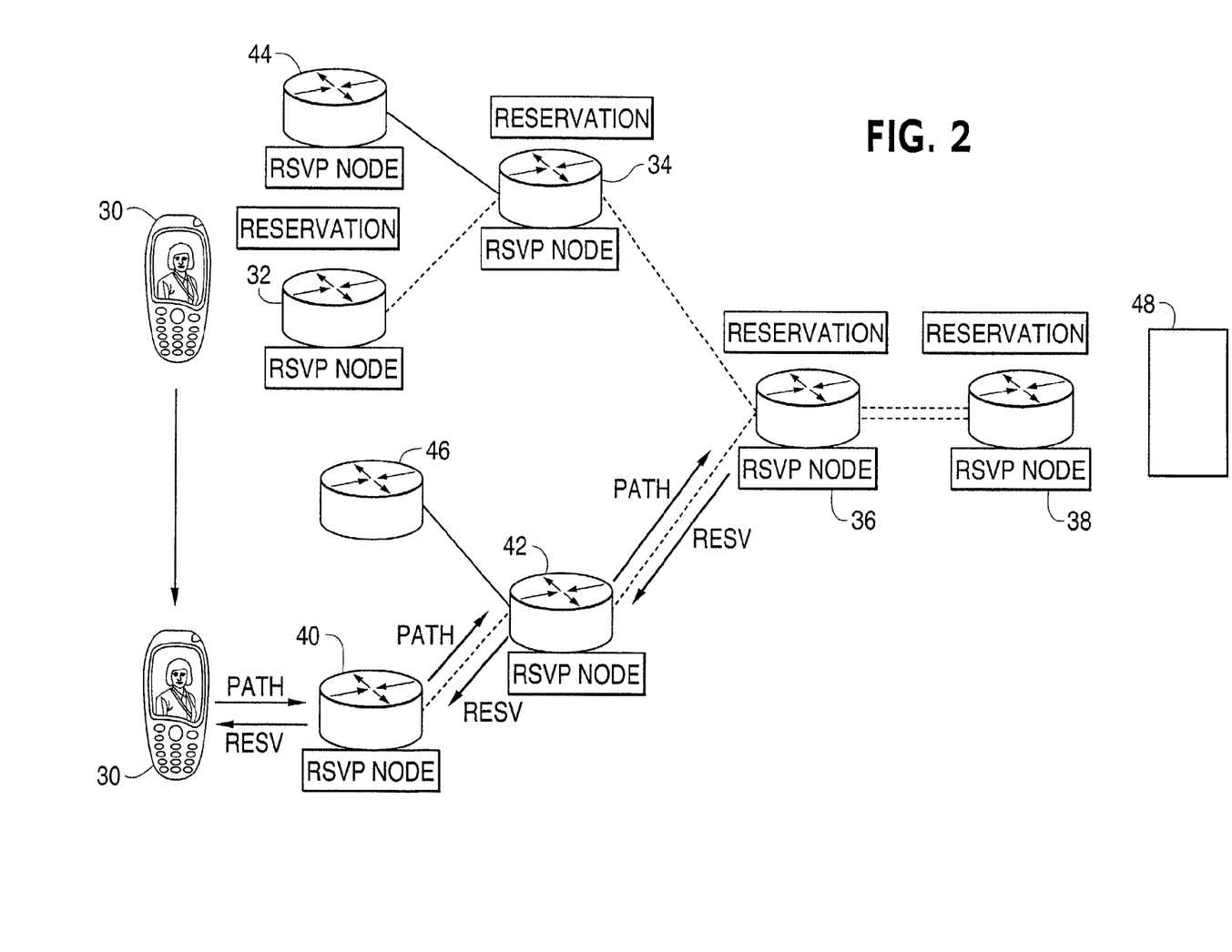
FIG. 2 is a diagram of a network where a mobile node is moved according to an example embodiment of the present invention.

FIG. 2 shows a diagram of a network where a mobile node is moved according to an example embodiment of the present invention. The network shown includes a mobile phone 30, multiple RSVP nodes 32–46, and a second (destination) node 48. Mobile node 30 desires to send a transfer of packets to second node 48 through the network. Initially, mobile node 30 sends a message to configure and establish a path through the network to the destination node 48. The path may include various RSVP nodes, as well as other possible nodes (not shown) In this example embodiment, the RSVP nodes are RSVP routers. The message that sets up the path (or channel), e.g., PATH message, establishes a channel for sending the packets from mobile node 30 to node 48. Once node 48 receives this PATH message, node 48 responds in acknowledgment by sending a second message, e.g., a RSVP message, back through the established path to mobile node 30. The RSVP message traverses through the path and causes each RSVP node to reserve resources for the pending transfer from mobile node 30. Therefore, once the RSVP message is received by mobile node 30, a path has been established for sending a flow from mobile node 30 to node 48, as well as resources have been reserved in all RSVP nodes along the path which ensure that a flow sent via the path attains a desired quality of service. Mobile node 30 may now send a flow consisting of one or more packets to destination node 48 through the established path.

As shown in FIG. 2, mobile node 30 has established a path through RSVP nodes 32, 34, 36 and 38 to destination node 48. When a RSVP node receives a flow, the RSVP node classifies the flow by looking at an address field or phone number in each packet. During classification, each RSVP node uses the address field in the packet header to determine if resources have been previously reserved for this flow on this RSVP node. Resources have been reserved in each RSVP node 32, 34, 36 and 38 such that when these RSVP nodes receive packets with a source address identifying them from mobile node 30, these reserved resources are used to then continue to route the flow through the network. Packets that arrive at the RSVP nodes which have no resources reserved may be queued and routed when the node has the opportunity to route these packets. Therefore, these packets are given a best effort quality of service. Packets that have reserved resources are routed in a more timely fashion since resources have already been reserved to expedite the routing of these packets. These resources may include bandwidth resources, buffers, etc.

Although only RSVP nodes have been shown in FIG. 2 to illustrate the present invention, other nodes and or devices may exist in the path between mobile node 30 and destination node 48, and between the various RSVP routers, for example, routers, switches, etc. and still be within the spirit and scope of the present invention. Further, other nodes, mobile or not, may be attached to the network.

If mobile node 30 is moved from its first position in FIG. 2 to its second position in FIG. 2 (denoted by the arrow), a new path must be established to destination node 48 for the current flow. Mobile node 30 sends a new PATH message through RSVP node 40 to RSVP node 42 and to RSVP node 36. This PATH message sets up a new path for the flow to from mobile node 30 to destination node 48 through RSVP nodes 40 and 42.

As shown in FIG. 2, RSVP node 36 exists in the old path (i.e., from mobile node 30 through nodes 32, 34), and the new path (from mobile node 30 through nodes 40, 42). Therefore, RSVP node 36 may be called a crossover node since it resides at the intersection of the old path and a new path. In methods and apparatus according to the present invention, the PATH message sent from mobile node 30 may only propagate upstream until it reaches a crossover point where an existing reservation already exists (i.e., RSVP node 36). The crossover RSVP node may not forward the PATH message further upstream since reservations from this point forward in the path still already exist for this current flow. Crossover RSVP node 36 responds to the PATH command by sending a RSVP message back through RSVP nodes 42 and 40 to mobile node 30. This RSVP message causes RSVP nodes 42 and 40 to establish reserved resources for the flow from mobile node 30.

Since mobile node 30 has moved, the mobile node may now be in a new subnetwork location. In this case, mobile node 30 is given a new care of address. Normally, when the PATH message is sent from mobile node 30 with the new care of address and is received by RSVP node 36, RSVP node 36 may not associate this address with the reserved resources for the flow since the care of address does not match the home address of mobile node 30 used to set up the original path and reserved resources. However, according to the present invention, the home address of mobile node 30 is present in a destination option header of each packet. RSVP nodes are configured to check this destination option header first when receiving a packet. Thus, when RSVP node 36 receives the path message from mobile node 30, RSVP node 36 notes the home address of mobile node 30 in the destination option header of each packet and associates the reserved resources with this flow from mobile node 30.

Once the path and reserved resources have been set up in RSVP node 40 and 42, mobile node 30 may now continue sending the flow from mobile node 30 to node 48 through new path, RSVP nodes 40, 42 and 36 and 38. The present invention is advantageous since the path command need not travel the full length of the path but only need travel to a crossover node. Thus, signal processing delay is reduced, network load is decreased, and data packets corresponding to the specific flow need not be handled as best effort traffic while adjusting to the new care of address for mobile node 30, but continue to receive the desired quality of service after mobile node 30 changes its location and IP address.

Figure 3:
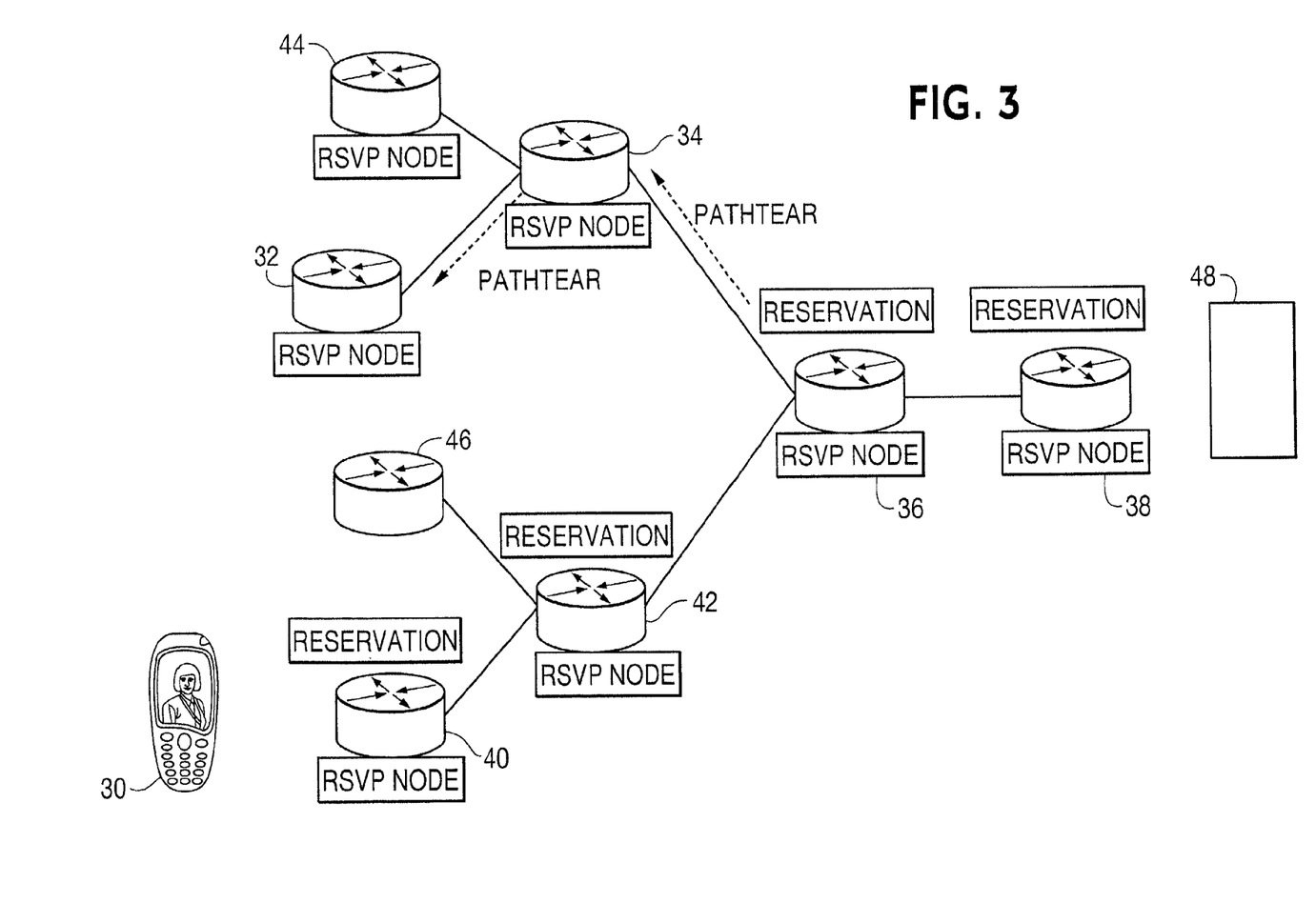
FIG. 3 is a diagram of a network during tear down of an old path according to an example embodiment of the present invention.

FIG. 3 shows a diagram of a network during tear down of an old path according to an example embodiment of the present invention. RSVP node 36, in addition to sending an RSVP message to mobile node 30 through RSVP nodes 40 and 42 to establish reserve resources for the new path, also sends a message to RSVP nodes 34 and 32 that were part of the original path. This message, i.e., RESVTEAR message, causes RSVP nodes 34 and 32 to release the reserved resources for the flow that was traveling through the old path. The RESVTEAR message may be propagated from RSVP node 34 to RSVP node 32. It may be propagated until it reaches mobile node 30 whereby mobile node 30 may discard this message which was destined to its old care of address. Therefore, RSVP nodes 32 and 34 may release the reserved resources, allowing the resources to be reallocated to other flows that may be received. This saves resources in that once mobile node 30 has moved to an established a new path, previously reserved resources are not continually reserved and not used.

Figure 4:
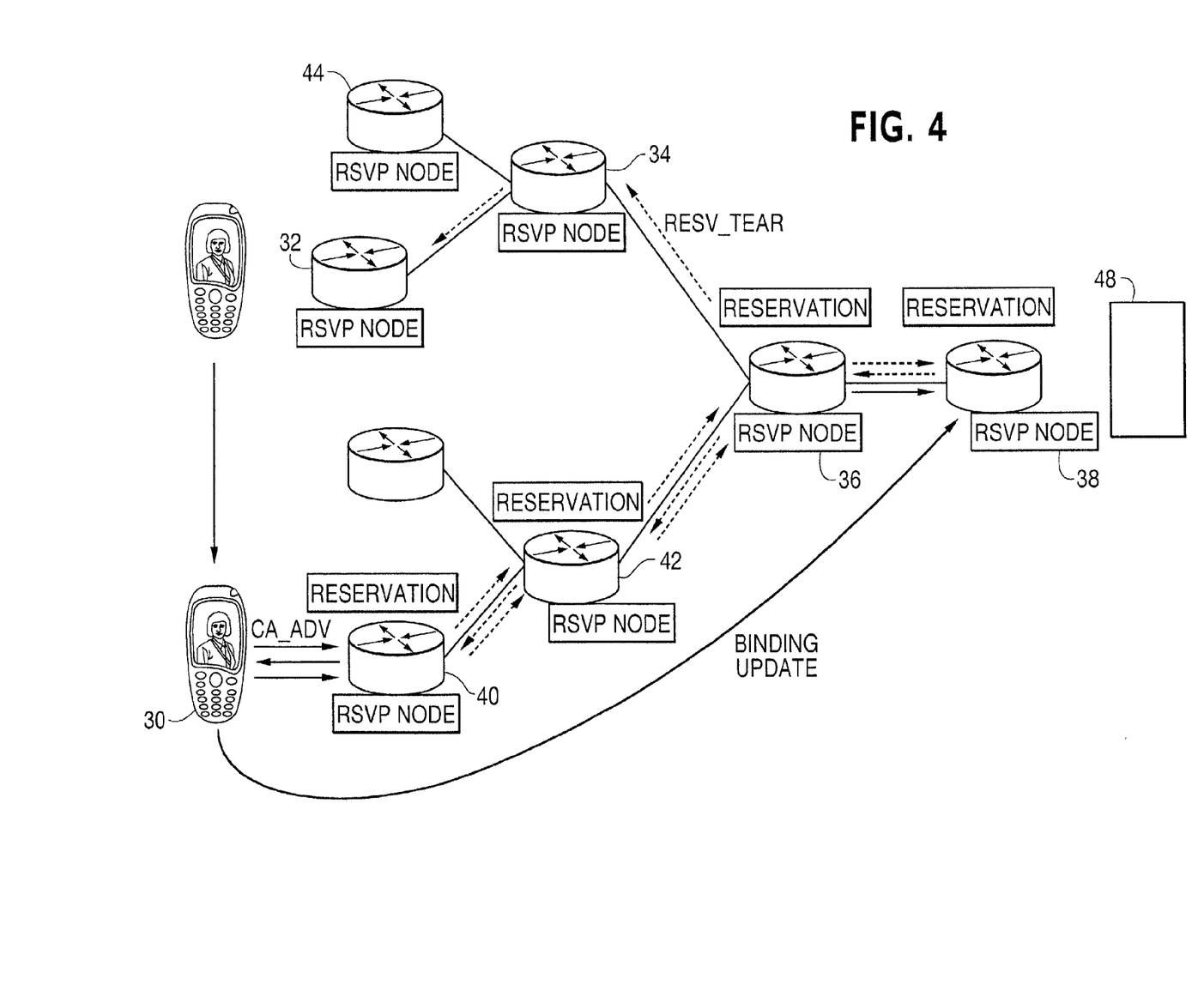
FIG. 4 is a diagram of a network with efficient handoffs according to an example embodiment of the present invention.

FIG. 4 shows a diagram of a network with efficient handoffs according to an example embodiment of the present invention. As shown in FIG. 4, according to the present invention, to improve the efficiency of handoff when a mobile node moves from one location to another, the mobile node may not only send a binding update, but also a RSVP message called "CA_ADV" (Care of Address Advertisement). A binding update may be sent from mobile node 30 to correspondent node 48. This notifies correspondent node 48 that mobile node 30 has moved. The CA_ADV RSVP message contains information that allows identification of the ongoing session. The CA_ADV message may be transported to the first RSVP node that is aware of this session (i.e., crossover RSVP node 36). The CA_ADV message may also be sent all the way to correspondent node 48. The CA_ADV message triggers a mapping between the home address and the new care of address of mobile node 30 in each RSVP router in the new path (i.e., RSVP nodes 40, 42, 36 and 38). In the case of RSVP routers in the old and the new path, the CA_ADV message triggers a re-mapping between the home address and the new care of address of mobile node 30.

At the first RSVP node which is aware of the session, RSVP node 36, the CA_ADV message triggers an immediate PATH refresh towards the mobile node's new care of address. Concurrently with the PATH refresh, a RESV_TEAR message may be sent towards mobile node 30's old care of address, that removes the reservation on the old path (i.e., RSVP nodes 34, 32), that is no longer needed. A PATH message may also be sent from crossover RSVP node 36 to correspondent node 48 concurrently with the sending of the RESV_TEAR message towards mobile node 30's old care of address. When the PATH message triggered by the CA_ADV RSVP message is received by mobile node 30, a RESV message may then be issued to reserve the resources on the new path between mobile node 30 and RSVP crossover node 36.

This is advantageous in that the reservation on the new path between mobile node 30 and correspondent node 48 is set up after one and one half round trip times between mobile node 30 and RSVP crossover node 36, as opposed to one and one half round trip times between mobile node 30 and correspondent node 48. Considering the importance of improving handoff performance, this is a significant improvement. For example, the round trip time between mobile node 30 and correspondent node 48 may be 200 ms, while the round trip time between mobile node 30 and crossover RSVP node 36 may be 50 ms. This implies a QoS setup time of 300 ms for current solutions, as opposed to 75 ms according to the present invention. The performance improvement in handoff is easily noticeable for a user.

In another embodiment of the present invention, a "Care of Address Advertisement" (CAA) object may be included in every PATH message sent by an IP node (e.g., RSVP router). The CAA object only needs to contain the home address and the new care of address of the mobile node. When a RSVP node receives a PATH message with a CAA object, one of two results may occur.

First, when a RSVP node receives a PATH message with a CAA object and does not have a path state established for the flow, the RSVP node establishes a new path state including the mapping between the home address and the careof address.

Secondly, when a RSVP node receives a PATH message with a CAA object and the RSVP node has a path state for the flow, either: (1) if the path state shows that the mapping between the home address and the careof address has been changed, the path state is updated using the new mapping carried in the CAA object, and the PATH message is forwarded to the next hop; or (2) if the path state shows that the mapping between the home address and the careof address hasn't been changed, the mapping information in the path state does not need to be changed. Whether or not the PATH message is forwarded depends on the rules defined in the current RSVP.

According to this embodiment of the present invention, the RSVP daemon doesn't need to get the careof address of the mobile node from the IP stack every time it receives a packet carrying a RSVP message, but just uses the information provided by the CAA object. In addition, the classification rule (i.e., whether to use the source address of the packet or home address in the home address option) can only be relied on if a "home address to careof address" mapping state has been established for the flow. This provides more efficient classification of received packets.

Methods and apparatus according to the present invention are advantageous in that they enable RSVP to work with mobile IP. Efficiency is improved because one doesn't have to set up end to end RSVP reserved resources whenever a mobile node moves. Network load is also decreased because a PATH command message does not have to be forwarded to the end of the path, but only to a crossover node. Moreover, resources are saved due to the tear down of the old path.

It is noted that the foregoing examples have been provided merely for the purpose of explanation and are in no way to be construed as limiting of the present invention. While the present invention has been described with reference to a preferred embodiment, it is understood that the words which have been used herein are words of description and illustration, rather than words of limitation. Changes may be made within the purview of the appended claims, as presently stated and as amended, without departing from the scope and spirit of the present invention in its aspects. Although the present invention has been described herein with reference to particular methods, materials, and embodiments, the present invention is not intended to be limited to the particulars disclosed herein, rather, the present invention extends to all functionally equivalent structures, methods and uses, such as are within the scope of the appended claims.

What is claimed is:

1. A method for efficient routing of mobile node packets comprising:
    moving a mobile node from a first location to a second location, the second location being outside a home address of the mobile node;
    sending a configuration message from a mobile node along a path to a second node;
    sending a confirmation message from the second node along the path to the mobile node, the confirmation message reserving resources in nodes in the path for a flow from the mobile node;
    sending the flow containing at least one packet from the mobile node to the second node along the path;
    classifying the flow by each node in the path based on a home address option in each at least one packet; and
    routing the flow by each node in the path, each node in the path using the reserved resources associated with the flow based on the classification.

2. The method according to claim 1, wherein the mobile node comprises a mobile phone.

3. The method according to claim 1, wherein the second node comprises a phone.

4. The method according to claim 1, further comprising each at least one packet having a temporary source address in a source address field of each at least one packet and the home address of the mobile node in a destination option of each at least one packet.

5. The method according to claim 4, wherein the temporary source address comprises a Care of Address (CoA).

6. The method according to claim 1, wherein the home address option is in a header of each at least one packet.

7. The method according to claim 1, wherein the first location comprises a first IP subnet and the second location comprises a second IP subnet.

8. The method according to claim 1, further comprising configuring a classification function at each node to perform the classifying.

9. The method according to claim 1, wherein the home address comprises an IP address.

10. The method according to claim 1, wherein the nodes are part of an Internet Protocol (IP) network.

11. The method according to claim 1, wherein the node comprises a RSVP router.

12. The method according to claim 11, wherein the configuration message comprises a PATH message.

13. The method according to claim 11, wherein the confirmation message comprises a RESV message.

14. The method according to claim 1, further comprising:
    moving the mobile node from the second location to a third location;
    sending a second configuration message from the mobile node to a crossover node in the path, the second configuration message sent along a second path from the mobile node to the crossover node;
    sending a second confirmation message from the crossover node to the mobile node, the second confirmation message reserving resources in nodes in the second path for the flow from the mobile node; and
    sending the flow from the mobile node to the second node along the second path between the mobile node and the crossover node and the path between the crossover node and the second node.

15. The method according to claim 14, further comprising sending a teardown message from the crossover node to a node in the path that is not between the crossover node and the second node, the teardown message being propagated to all other nodes in the path that are not between the crossover node and the second node, the teardown message causing each node in the path that is not between the crossover node and the second node to release the reserved resources for the flow from the mobile mode.

16. The method according to claim 15, wherein the crossover node and each node comprise a RSVP router.

17. The method according to claim 16, wherein the teardown message comprises a RESVTEAR message.

18. An article comprising a storage medium having instructions stored therein, the instructions when processed causing a router to perform:
    receiving configuration information that configures the router to classify a received flow based upon a home address option in a destination option header of a packet in the flow if the address is present;
    reserving resources in the router for a flow based on receipt of a message;
    receiving the flow, the flow containing at least one packet;
    classifying the flow by the router based on the destination option header in each at least one packet; and
    routing the flow by the router, the routing using the reserved resources associated with the flow based on the classification.

19. The article according to claim 18, further comprising:
    receiving a second message;
    propagating the second message to other routers if appropriate; and
    releasing the reserved resources for the flow in response to the second message.

20. The article according to claim 18, wherein the router comprises a RSVP router.

21. The article according to claim 18, wherein the at least one packet comprises an IP packet.

22. A network comprising:
    at least one first node;
    at least one second node; and
    at least one router, each at least one router configured to classify a received flow based upon a home address option in packets in the flow if the address is present, wherein one at least one first node sends a flow comprising at least one packet to one at least one second node, at least one router reserving resources in the router for the flow based on receipt of a previous message, the at least one router classifying the flow based on the home address option in each at least one packet, and routing the flow using the reserved resources associated with the flow based on the classification.

23. The network according to claim 22, wherein the one at least one first node is a mobile phone.

24. The network according to claim 22, wherein the address comprises a home address of the at least one first node.

25. The network according to claim 22, wherein the one at least one second node comprises a phone.

26. The article according to claim 22, wherein the at least one router comprises at least one RSVP router.

27. The article according to claim 22, wherein the at least one packet comprises an IP packet.

28. The article according to claim 22, wherein the home address option is in a destination option header in the at least one packet.

29. A router comprising:
- a reservation module, the reservation module reserving resources for a flow in response to receipt of a message from a second node;
- a receiving module, the receiving module receiving the flow comprising at least one packet, the flow originating at a first node and having a destination of the second node;
- a classification module, the classification module classifying the received flow based upon a home address option in the at least one packet in the flow if the address is present; and
- a routing module, the routing module routing the received flow using the reserved resources associated with the flow based on the classification.

30. The router according to claim 29, wherein the message comprises a RESV message.

31. The router according to claim 29, wherein the home address option is in a destination option header in the at least one packet.

32. The router according to claim 29, wherein the at least one packet comprises an IP packet.

33. The router according to claim 29, wherein the address comprises a home IP address of the first node.

34. The router according to claim 29, wherein the first node comprises a mobile phone.

35. The router according to claim 29, wherein the second node comprises a phone.

36. A method for efficient handoff of a mobile node flow comprising:
- sending a flow containing at least one packet from a mobile node to a second node along a first path;
- sending a first message from the mobile node along a second path to the second node, the second path including one at least one node in the first path; and
- sending a second message from the mobile node to at least one of the second node and the one at least one node, the second message triggering the sending of a third message from at least one of the second node and the one at least one node to the mobile node, the second message triggering a mapping between a home address and a temporary address of the mobile node in each at least one node in the second path.

37. The method according to claim 36, wherein the mobile node comprises a mobile phone.

38. The method according to claim 36, wherein the second node comprises a phone.

39. The method according to claim 36, wherein the at least one packet comprises an IP packet.

40. The method according to claim 36, wherein the at least one node comprises a RSVP router.

41. The method according to claim 36, wherein the temporary address comprises a care of address of the mobile node.

42. The method according to claim 36, wherein the first message comprises a binding update message.

43. The method according to claim 36, wherein the second message comprises a care of address advertisement RSVP message.

44. The method according to claim 36, wherein the third message comprises a PATH message.

45. The method according to claim 36, further comprising sending the third message from the one at least one RSVP router to the second node.

46. The method according to claim 36, further comprising sending a fourth message in response to the third message from the mobile node to the one at least one node, the fourth message reserving resources for the flow in each node in the second path between the one at least one node and the mobile node.

47. The method according to claim 46, wherein the fourth message comprises a RESV message.

48. The method according to claim 36, further comprising sending a fifth message from the one at least one node to the at least one node in the first path that is not in the first path between the one at least one node and the second node, the fifth message removing reservations for the flow.

49. The method according to claim 48, wherein the fifth message comprises a RESVTEAR message.

50. The method according to claim 36, wherein the second message comprises a PATH message.

51. The method according to claim 50, wherein the second message contains an object containing the home address and the temporary address, each at least one node establishing a path state including the mapping between the home address and the temporary address if no path state for the flow has been established.

52. The method according to claim 51, comprising updating the path state if a path state for the flow has been established and the mapping between the home address and the temporary address has changed.

53. The method according to claim 51, comprising not updating the path state if a path state for the flow has been established and the mapping between the home address and the temporary address has not changed.

* * * * *